United States Patent [19]
Huang et al.

[11] Patent Number: 6,143,182
[45] Date of Patent: Nov. 7, 2000

[54] PROCESS FOR CHEMICALLY OXIDIZING WASTEWATER WITH REDUCED SLUDGE PRODUCTION

[75] Inventors: Yao-Hui Huang; Gaw-Hao Huang; Shan-Shan Chou; Huey-Song You; Shwu-Huey Perng, all of Hsinchu, Taiwan

[73] Assignee: Industrial Technology Research Institute, Hsinchu, Taiwan

[21] Appl. No.: 09/106,276

[22] Filed: Jun. 29, 1998

[30] Foreign Application Priority Data

May 1, 1998 [TW] Taiwan ............................... 87106787

[51] Int. Cl.⁷ .................................................. C02F 1/72
[52] U.S. Cl. ..................... 210/712; 210/715; 210/717; 210/721; 210/724
[58] Field of Search .................................. 210/712, 713, 210/714, 715, 716, 717, 721, 722, 724, 725, 726, 738, 759

[56] References Cited

U.S. PATENT DOCUMENTS

| | | | |
|---|---|---|---|
| 3,350,302 | 10/1967 | Demeter et al. | 210/711 |
| 4,927,543 | 5/1990 | Bablon et al. | 210/711 |
| 4,997,573 | 3/1991 | Browne | 210/714 |
| 5,538,636 | 7/1996 | Gnann et al. | 210/631 |
| 5,635,073 | 6/1997 | Aktor et al. | 210/714 |
| 5,770,091 | 6/1998 | Binot et al. | 210/711 |
| 5,800,717 | 9/1998 | Ramsay et al. | 210/711 |

*Primary Examiner*—Peter A. Hruskoci
*Attorney, Agent, or Firm*—Sughrue, Mion, Zinn, Macpeak & Seas, PLLC

[57] ABSTRACT

A process to purify wastewater by chemical oxidation is disclosed. The purification is carried out in a fluidized bed of a suitable particulate carrier upon which the iron(III) compound produced by Fenton's reaction crystallizes or coats, thereby reducing the sludge content of effluent over 50%. In addition, the fluidized bed improves the COD removal by way of thoroughly mixing the wastewater with adding agents.

8 Claims, 1 Drawing Sheet

PROCESS FOR CHEMICALLY OXIDIZING WASTEWATER WITH REDUCED SLUDGE PRODUCTION

BACKGROUND OF THE INVENTION

1. Field of the Invention

The present invention relates a process for removing chemical oxygen demand (COD) from wastewater by chemical oxidation using Fenton's reagent. More particularly, it relates to a chemical oxidation process utilizing a fluidized bed to reduce the sludge production and to improve the COD removal efficiency.

2. Description of the Related Arts

To meet strict laws on environmental protection, the COD in effluent discharged from factories must be reduced to a significant extent. A feasible method, known as Fenton's method, has been widely used for the reduction of COD in wastewater. According to Fenton's method, hydrogen peroxide and iron(II) compounds are added to wastewater so that the organic pollutants contained in wastewater are oxidized by the hydroxyl free radicals (OH$\cdot$) produced by the reaction between the hydrogen peroxide and the ferrous ion. However, in practical applications, Fenton's method is not completely satisfactory and the disadvantages thereof are summarized as below:

1. The necessity of addition of chemical reagents such as hydrogen peroxide, ferrous ions, acids and alkalis makes the practice of this method costly.

2. A significant amount of iron(III) hydroxide sludge is produced. This necessitates a further treatment of the iron hydroxide sludge. Such treatment is also costly.

The cost of ferrous ions and sludge treatment is about $1/4$–$1/2$ of total operational cost. Conventionally, the produced iron hydroxide sludge is separated from wastewater by using sedimentation or flotation techniques. However, this has burdened the treatment facilities with a large quantity of sludge and leads to the problem of disposing the sludge.

SUMMARY OF THE INVENTION

It is therefore an object of the invention to lower the operational costs of using Fenton's method and to provide a process for chemically oxidizing wastewater with reduced sludge production.

In order to decrease the amount of the produced iron hydroxide sludge, the chemical oxidation according to the present crystallization process is carried out in a fluidized bed of a suitable particulate carrier. The fluidized bed process has been described in the prior art to remove heavy metals in wastewater. For example, U.S. Pat. No. 4,764,284 discloses a process for removing heavy metals from wastewater by reacting with a solution of an alkali, carbonate and/or bicarbonate in a crystallization reactor containing a fluidized bed of suitable bed material. Similarly, U.S. Pat. No. 4,861,493 discloses a process for the removal of heavy metals from wastewater in the form of their sulfide by mixing the wastewater with an alkali metal sulfide in a fluidized bed reactor. Nevertheless, a fluidized bed process is employed in the present invention to allow the iron hydroxide sludge produced by Fenton's method to be discarded in the reactor exclusively, thereby reducing the sludge content of the effluent. In addition, the fluidized bed process used herein improves the COD removal efficiency by way of thoroughly mixing the wastewater with Fenton's reagent.

To accomplish the aforementioned objective, the present invention provides a process for chemically oxidizing wastewater with reduced sludge production, which includes: thoroughly mixing the wastewater with Fenton's reagent, including ferrous ions and hydrogen peroxide in a fluidized bed reactor, which is provided with a suitable particulate carrier to cause iron(III) produced by the reaction to exclusively crystallize or coat onto the particulate carrier; and removing the treated wastewater as effluent from the fluidized bed reactor.

BRIEF DESCRIPTION OF THE DRAWINGS

The invention is now further explained with reference to the drawing.

DETAILED DESCRIPTION OF THE INVENTION

Figure 1:
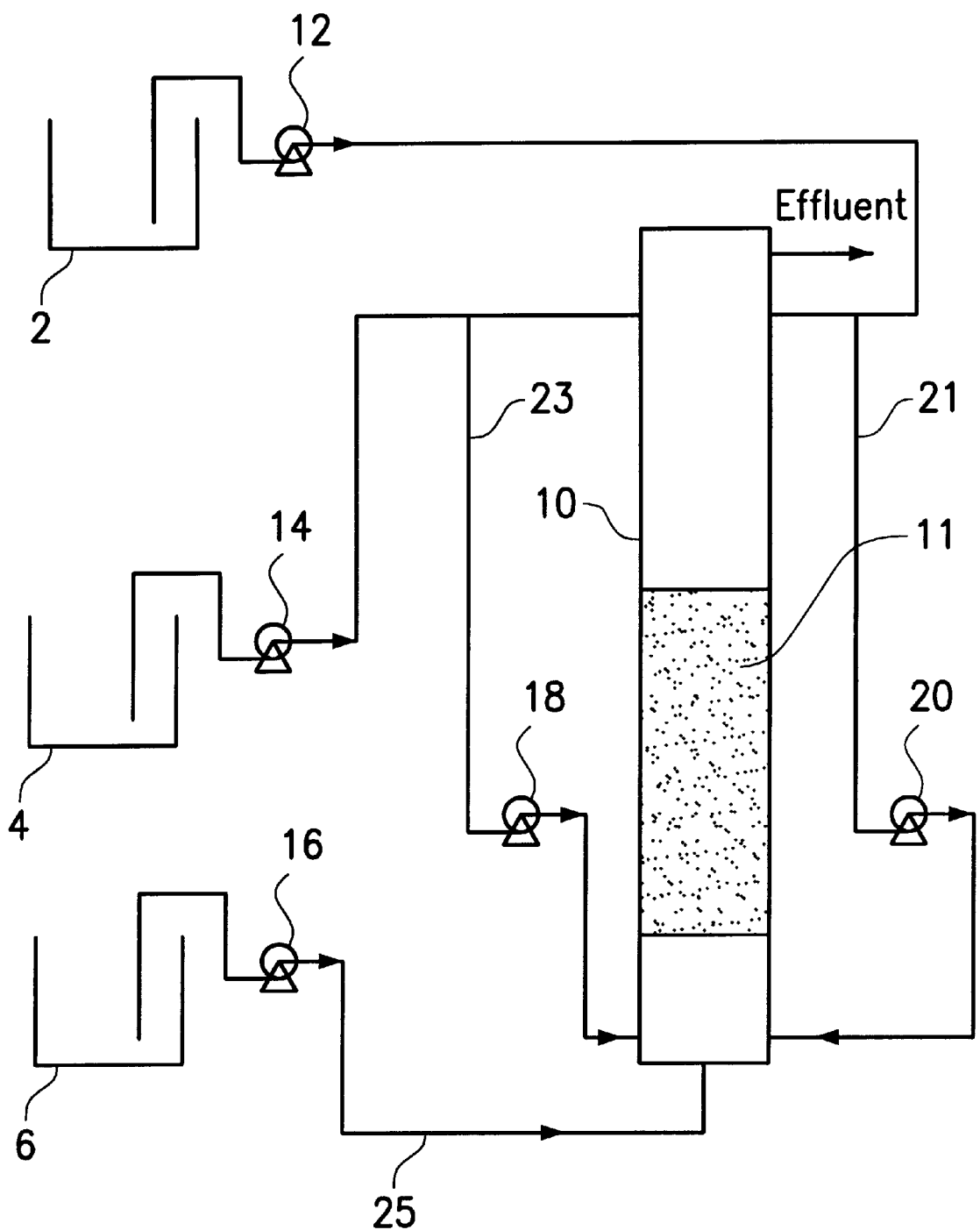
FIG. 1 is a flow diagram depicting an embodiment of the process of the invention.

FIG. 1 shows a preferred embodiment of an apparatus for performing the method of the invention. According to schematic diagram 1, the wastewater is treated in a fluidized bed reactor 10, having recycling conduits 21, 23 and recirculation pumps 18, 20 for recirculating the wastewater within the reactor. The reactor 10 is provided with a suitable particulate carrier 11 to cause iron(III) compounds produced by Fenton's reaction to crystallize or coat onto the carrier. The wastewater is stored in tank 6 and from there is draw into the fluidized bed reactor 10 by pump 16 through conduit 25. The particulate carrier 11 is brought and maintained in fluidized condition by recirculating the wastewater within the reactor 10 with a suitable superficial velocity of about 10–120 m/hr. Particulate carriers suitable for use in this invention include but are not limited to brick grains, activated carbon, sand, diatomaceous-silica, glass, synthetic resins, pumic, and artificial pellets. In the case of brick grains, the superficial velocity of recirculation is preferably within the range from 30 to 60 m/hr.

Still referring to FIG. 1, a hydrogen peroxide solution is pumped from tank 2 through pump 12 and conduit 21 into reactor 10, and an iron(II) solution is also pumped into reactor 10 from tank 4 through pump 14 and conduit 23. As shown in the figure, in order to thoroughly mix the Fenton reagents with wastewater, the hydrogen peroxide and ferrous ions are preferably injected into the bottom of the reactor through different conduits. By this, a localized supersaturated condition in the reactor is avoided. According to the present process, the ferrous ions are preferably present in an amount of 25–500 mg per liter of wastewater, and the weight ratio of hydrogen peroxide to ferrous ions is preferably within the range from 0.2 to 5.

The wastewater and the solution of hydrogen peroxide and ferrous ions are thus thoroughly mixed in the fluidized bed reactor 10, wherein the formed iron(III) compound crystallizes or coats onto the surface of the particulate carrier 11. The formed iron(III) compounds can be exclusively separated from wastewater by the proper controls of pH value, hydraulic retention time and the surface loading rate of the fluidized bed. According to the invention, the pH of the wastewater is preferably controlled to a level between 2 and 5; the hydraulic retention time of wastewater in the reactor is preferably about 10–600 minutes; and the surface loading rate of the fluidized bed reactor preferably ranges from 0.02 to 5 kgFe/m$^2$hr. Finally, the thus treated wastewater is discharged through a effluent conduct provided at the upper end of the reactor. When the treatment is completed, the particulate carrier can be recovered by removing the iron(III) compounds thereupon.

The process for treating wastewater according to the invention can be applied in various fields as follows: (1) the wastewater from dyeing and finishing or the manufacture of synthetic fibers and textiles; (2) the wastewater from petrochemical or chemical plants; and (3) the wastewater from paper-making.

The invention is described in greater detail with reference to the following non-limiting examples.

EXAMPLE 1

Water having no organic content was treated according to the process of the invention by an apparatus as depicted in FIG. 1, while using brick grains as the carrier of the fluidized bed. The operating conditions of the treatment and the data obtained following the treatment according to the invention are listed in Table 1 below.

TABLE 1

| Operating conditions (TOC† = 0 mg/L) | | | | Qualities of final effluent | | |
|---|---|---|---|---|---|---|
| $[H_2O_2]/[Fe^{+2}]$ (mg/L/mg/L) | $[Fe^{+2}]$ (mg/L) | HRT* (min) | Surface loading rate (kg Fe/m² hr) | pH | [Fe] (mg/L) | Sludge removal percentage (%) |
| 0.323 | 318 | 100.0 | 0.27 | 3.39 | 79 | 75 |
| 0.323 | 318 | 100.0 | 0.27 | 3.46 | 50 | 84 |
| 0.333 | 315 | 50.0 | 0.53 | 3.88 | 80 | 75 |
| 0.355 | 310 | 100.0 | 0.26 | 3.86 | 58 | 81 |
| 0.355 | 310 | 50.0 | 0.53 | 3.92 | 80 | 74 |
| 0.355 | 310 | 25.0 | 1.05 | 3.90 | 73 | 76 |
| 0.355 | 310 | 100.0 | 0.26 | 4.12 | 97 | 69 |
| 0.314 | 323 | 50.0 | 0.55 | 3.52 | 69 | 79 |
| 0.314 | 323 | 25.0 | 1.10 | 3.34 | 89 | 72 |
| 0.433 | 132 | 41.7 | 0.25 | 3.17 | 47 | 64 |
| 0.304 | 132 | 41.7 | 0.25 | 4.10 | 31 | 77 |

†TOC: Total Organic Carbon;
*HRT: Hydraulic Retention Time

As shown in Table 1, the sludge content of the final effluent was reduced by more than 80% through choosing the proper pH value, hydraulic retention time, and surface loading rate.

EXAMPLE 2

Benzoic acid containing water having a total organic carbon of 95.3 mg/L was treated according to the process of the invention by an apparatus as depicted in FIG. 1, while using brick grains as the carrier of the fluidized bed. On the other hand, same procedures were repeated without a particulate carrier (i.e. conventional Fenton's method) for comparative purposes. The operating conditions for the treatments and the comparison results are summarized in Table 2 below.

TABLE 2

| Operating conditions TOC† = 95.3 mg/L, $[H_2O_2]$ = 200 mg/L | | | | Qualities of Final effluent | | | |
|---|---|---|---|---|---|---|---|
| Carrier amount (g/L) | $[Fe^{+2}]$ (mg/L) | HRT* (min) | Surface loading rate (kg Fe/m² hr) | pH | [Fe] (mg/L) | TOC (mg/L) | Sludge removal percentage (%) |
| 133 | 41.0 | 52.1 | 0.04 | 3.74 | 6.3 | 58 | 83.1 |
| 0 | 41.0 | 52.1 | 0.04 | 4.10 | 37.2 | 55 | 0 |
| 133 | 41.0 | 20.8 | 0.09 | 3.44 | 13.9 | 52 | 65.3 |
| 0 | 41.0 | 20.8 | 0.09 | 3.51 | 40.1 | 51 | 0 |
| 133 | 27.6 | 52.1 | 0.03 | 3.53 | 8.3 | 57 | 63.4 |
| 0 | 27.6 | 52.1 | 0.03 | 3.80 | 22.7 | 71.2 | 0 |

†TOC: Total Organic Carbon;
*HRT: Hydraulic Retention Time

The results in Table 2 indicates that the process of the invention can significantly reduce the sludge production while ensuring a reasonable removal of TOC as compared to the conventional method.

EXAMPLE 3

The wastewater from a dyeing and finishing factory having a total organic carbon of 39.7 mg/L was treated according to the process of the invention by an apparatus as depicted in FIG. 1, while using brick grains as the carrier of the fluidized bed. On the other hand, same procedures were repeated without a particulate carrier for comparative purposes. The operating conditions for the treatments and the comparison results are summarized in Table 3 below.

TABLE 3

| Operating conditions TOC† = 39.7 mg/L, [H₂O₂] = 50 mg/L | | | | Qualities of Final effluent | | | |
| --- | --- | --- | --- | --- | --- | --- | --- |
| Carrier amount (g/L) | [Fe⁺²] (mg/L) | HRT* (min) | Surface loading rate (kg Fe/m² hr) | pH | [Fe] (mg/L) | TOC (mg/L) | Sludge removal percentage (%) |
| 133 | 49.8 | 18.4 | 0.373 | 3.3 | 20.3 | 19.9 | 57.5 |
| 0 | 49.8 | 18.4 | 0.373 | 3.4 | 49.6 | 23.2 | 0 |

†TOC: Total Organic Carbon;
*HRT: Hydraulic Retention Time

As shown in Table 3, the process of the invention reduced the sludge content of the effluent by 57.5% while achieving a better TOC removal.

In summary, the process according to the invention possesses the following advantages:

1. The fluidized bed process obviates the need for using excessive quantities of unreacted reagents owing to the poor mixing of the conventional method.

2. The iron hydroxide sludge produced by Fenton's method is exclusively discarded in the fluidized bed reactor, thereby reducing by at least half of the sludge content of the final effluent.

3. The sludge content of the effluent is reduced, thus obviating the need for treating a large quantity of iron hydroxide sludge in the subsequent processing unit such as sedimentation or flotation.

What is claimed is:

1. A process for chemically oxidizing wastewater containing TOC (total organic carbon) with reduced sludge production, said process comprising injecting water water, hydrogen peroxide and ferrous ions from different conduits into a fluidized bed reactor, thoroughly mixing the wastewater with ferrous ions and hydrogen peroxide in the fluidized bed reactor, which is provided with a suitable particulate carrier to cause iron (III) compound produced from said mixing to exclusively crystallize or coat onto said carrier and chemically oxidize said wastewater, and removing the treated waste water from said reactor, wherein said TOC is removed from said wastewater and sludge production is reduced in the fluidized bed reactor, wherein the pH value of the wastewater ranges from about 2 to 5;

wherein the hydraulic retention time of the wastewater in the fluidized bed reactor is about 10–600 minutes, and wherein the surface loading rate of the fluidized bed ranges from about 0.02 to 5 kgFe/m²hr.

2. The process for chemically oxidizing wastewater as claimed in claim 1, wherein said particulate carrier is selected from the group consisting of brick grains, activated carbon, sand, diatomaceous-silica, glass, synthetic resins, pumic, and artificial pellets.

3. The process for chemically oxidizing wastewater as claimed in claim 1, wherein said particulate carrier is kept fluidized by recirculating the wastewater in the reactor with a superficial velocity of about 10–120 m/hr.

4. The process for chemically oxidizing wastewater as claimed in claim 3, wherein said particulate carrier is brick grains and is kept fluidized by recirculating the wastewater in the reactor with a superficial velocity of about 30–60 m/hr.

5. The process for chemically oxidizing wastewater as claimed in claim 1, wherein said ferrous ions are injected into the fluidized bed reactor from the bottom of the same.

6. The process for chemically oxidizing wastewater as claimed in claim 5, wherein the ferrous ions and the hydrogen peroxide are injected into the bottom of the reactor through different conduits.

7. The process for chemically oxidizing wastewater as claimed in claim 1, wherein the weight ratio of hydrogen peroxide to ferrous ions ranges from 0.2 to 5.

8. The process for chemically oxidizing wastewater as claimed in claim 1, wherein said ferrous ions are present in an amount of 25–500 mg per liter of wastewater.

* * * * *